United States Patent [19]

Martinek

[11] 3,878,978
[45] Apr. 22, 1975

[54] METHOD FOR SEVERING TUBULAR FILM
[75] Inventor: Harold H. Martinek, Danville, Ill.
[73] Assignee: Tee-Pak, Inc., Chicago, Ill.
[22] Filed: Nov. 30, 1973
[21] Appl. No.: 420,471

[52] U.S. Cl. .................................. 225/1; 225/93.5
[51] Int. Cl. ............................................... B26f 3/00
[58] Field of Search ............................. 225/1, 93.5

[56] References Cited
UNITED STATES PATENTS
2,956,717   10/1960   Scharf .................................. 225/1
3,271,493   9/1966    Berge .................................. 264/143

Primary Examiner—Andrew R. Juhasz
Assistant Examiner—Leon Gilden
Attorney, Agent, or Firm—Russell L. Brewer; Neal J. Mosely

[57] ABSTRACT

A tubular flexible film or filament is severed along a pre-determined locus by cooling the film or filament at said pre-determined locus until the film becomes brittle and striking the film at said predetermined locus thereby severing one portion of the film from another. The method preferably contemplates severing a shirred artificial sausage casing by directing a spray of cold gas against the predetermined locus of the casing. Cooling of the casing and the striking thereof for severing the casing is accomplished substantially simultaneously by the cold gas impinging on the casing.

7 Claims, 4 Drawing Figures

PATENTED APR 22 1975 3,878,978

METHOD FOR SEVERING TUBULAR FILM

DESCRIPTION OF THE PRIOR ART

In the past, the severing of tubular films, e.g., shirred artificial sausage casings, often has been accomplished by passing a knife through the casing or passing a heated wire through the casing. However, these methods were not well suited to the severing of shirred artificial sausage casings. What generally happened in those cases was the formation of a tab-like end on the shirred casing. This tab-like end often interfered with the performance of the shirred sausage casing, particularly in terms of its ability to fit over a stuffing horn.

SUMMARY OF THE INVENTION

This invention relates to a method for severing flexible tubular films and filaments capable of flexing at least 90° by cooling the tubular film or filament at a predetermined locus until the material becomes brittle, e.g., incapable of flexing more than about 5° without breaking, and striking the film at the predetermined locus, thereby causing one portion of the tubular film or filament to sever from another portion.

In a preferred aspect of the invention, a shirred artificial sausage casing is severed from the unshirred inflated casing stock by directing a spray of cold "liquified" gas against the peripheral surface of the unshirred casing stock adjacent to the shirred casing.

The advantages of this invention include: the ability to sever a tubular film or filament in a simple, fast, and easy manner; the ability to sever tubular films and filaments with equipment requiring little if any maintenance; the ability to sever films and filaments without actual physical contact as is normally encountered with a mechanical apparatus; the ability to sever films positioned over a support e.g., a mandrel; the ability to produce shirred artificial sausage casings having a substantially uniform surface and configuration; the ability to sever shirred artificial sausage casings from unshirred casing without forming a tab-like end resulting from conventional severing methods.

DRAWINGS

DESCRIPTION OF THE PREFERRED EMBODIMENTS

Figure 1:
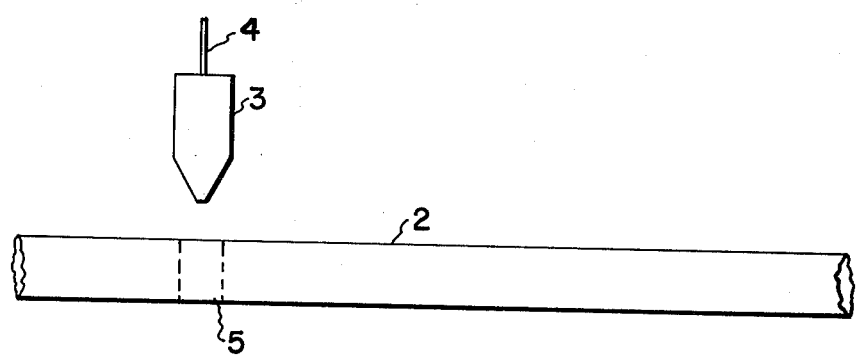
FIG. 1 is a view in front elevation showing the severance of a filament employing one spray nozzle.

This invention is based upon the discovery that tubular films and filaments can be severed at a predetermined locus by first cooling the tubular film or filament sufficiently so that it becomes extremely brittle and striking the cooled portion to sever the tubular film or filament. The invention finds particular advantage in severing shirred artificial sausage casings. Normally, it has been cutomary to deshirr a small portion of the shirred casing, sever the deshirred portion from the shirred portion, and then recompress the remainder of the deshirred portion onto the shirred portion of the casing. This resulted in the formation of a tab-like end on the shirred casing.

In general, the invention is applicable to the severing of any flexible thermoplastic polymeric tubular films and filaments which cannot be severed by simple bending. Polymeric materials which are particularly adapted to this invention include: polyethylene, polypropylene, regenerated cellulose, amylose, cellulose acetate, saran, cellulose nitrate, alginates, vinyl chloride, vinyl acetate, styrene, polyvinyl alcohol, and the like.

The polymeric materials normally are formed into shaped articles, i.e., tubular films which can subsequently be severed. The tubular films which are particularly adapted to the invention have a wall thickness of from about 0.0005 to 0.010 inches and the filaments a diameter of from about 0.0005 to 0.010 inches.

Typically, the tubular film or filament is cooled by spraying a cold fluid, preferably a gas obtained from a liquified gas source such as carbon dioxide, nitrogen, oxygen, helium, argon, and the like, through a spray nozzle or annular ring. By appropriate placement of spray emitting apparatus, e.g., a nozzle of annular ring, severance of the tubular film or filament can be conducted at a predetermined locus. As the cold fluid is passed through the spray emitting apparatus, e.g., an annular ring or nozzle, it cools the immediate surroundings and the tubular film or filament.

The polymeric materials, usually cellulose, in the instance of artificial sausage casings, are cooled to a point where the material becomes extremely brittle, e.g., for cellulose to a temperature of about −50°F. or below. Any of these cold fluids, obtained from liquified gases, when sprayed through a nozzle or annular ring is capable of cooling these polymeric materials to an embrittling temperature.

The conditions for cooling the tubular film or filament to the "brittle" temperature varies with the temperature of the gas, the nozzle opening or orifice opening in the annular ring, the exposure time, etc. These conditions can be regulated as desired. Generally, it is desired to employ nozzles or annular rings having a plurality of small orifices (three to six), having an opening of about 0.005 to 0.250 inches in diameter, so that the impingement of the gas can be limited to a predetermined locus or defined area on the film or filament.

Carbon dioxide is a preferred liquified gas for cooling and severing the casing. It normally is maintained at a temperature from about 0° to 68°F. and at a pressure from about 325 to 920 psig. On release, the $CO_2$ is ejected at high velocity at the sublimation temperature, i.e., −109°F. With this $CO_2$ gas the exposure time for cooling and severing a cellulosic film having a wall thickness of from about 0.0005 to 0.010 inch generally is from about 0.1 to 5.0 seconds when the gas is sprayed through nozzles as described. The exposure time may be slightly longer for some polymeric materials or shorter for others, but the time can be varied as desired. Accordingly, exposure times can be regulated as desired when using colder gases, e.g., liquid nitrogen.

After the tubular film or filament has been cooled to the point, such that it is very brittle, the film or filament can be severed by any flexing movement. One advantage of spraying a cold gas from a liquified gas source through a nozzle or annular ring is that the impingement of the gas against the surface of the film usually is sufficient to flex and sever the film. Further, where the spraying is conducted in an atmosphere having a relative humidity of from about 30% to 99% at a temperature of from about 60°–80° F. ice crystals are formed by the spraying of such cold gas through the nozzle and the ice crystals along with the gas flex the tubular film or filament to sever it. Carbondioxide is unique in that in addition to the formation of ice crystals which effect a striking of the casing, solid dry ice particles are formed when the liquified $CO_2$ is sprayed. These small particulates of $CO_2$ and $H_2O$ act in the same manner as a sand blast unit and provide for a smoothing of the shattered, severed end of the tubular shirred sausage casing.

By the term "striking" as used herein it is meant to refer to a force causing movement or flexing of the cooled brittle film or filament at the predetermined locus. For example, a striking force can simply be the movement of the shirred casing causing flexing of the casing at the predetermined locus. It can also be a mechanical rubbing, striking, twisting, etc. as applied to the casing or it can be the force of an impinging gas or particulate matter against the predetermined locus.

In the accompanying drawings, several embodiments are presented for showing methods by which tubular films and filaments of polymeric materials and particularly shirred artificial sausage casings made of regenerated cellulose can be severed.

In FIG. 1, a solid tubular filament 2 of polyethylene having a diameter of about 1.5 mils is placed about 1 inch from spray nozzle 3 through which cold $CO_2$ from a liquified $CO_2$ source is sprayed. The $CO_2$ is supplied to spray nozzle 3 through supply line 4 at a pressure of generally from about 920 psig and a temperature of about 68° F. As the $CO_2$ leaves the nozzle, it is vaporized instantaneously, and converted to $CO_2$ gas and $CO_2$ solid particles at the sublimation temperature. Severance of the filament at predetermined locus 5 is effected by the cooling of the filament from the sprayed $CO_2$ and the striking of the cold filament at predetermined locus 5 by $CO_2$ gas, solid $CO_2$ particles and ice crystals formed by the rapid cooling of the immediate surroundings. A spray period of about 0.5 second usually is sufficient to sever the filament.

Figure 2:
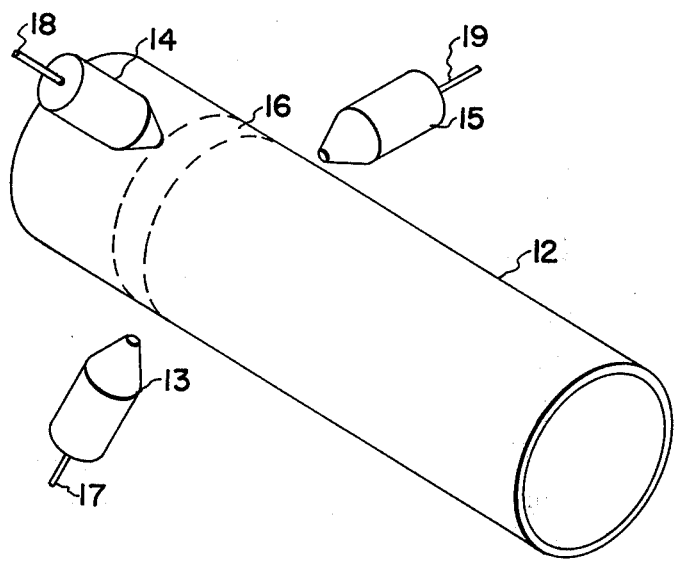
FIG. 2 is an isometric view showing an arrangement of three nozzle sections for severing a tubular film.

In FIG. 2 a tubular film 12 of vinyl chloride having a wall thickness of about 2.0 mils and a diameter of about 5 inches has positioned about it spray nozzles 13, 14, and 15. These are substantially equidistant and equiangularly spaced about tubular film 12 for defining a predetermined locus 16 about which the tubular flim can be severed. Liquid nitrogen is vaporized to nozzles 13, 14 and 15 through supply lines 17, 18, and 19, respectively. With the nozzle having an opening of about 0.10 inches in diameter, a spray period of from 0.3–0.6 seconds generally is sufficient when using a cold nitrogen jet to sever the film.

Figure 3:
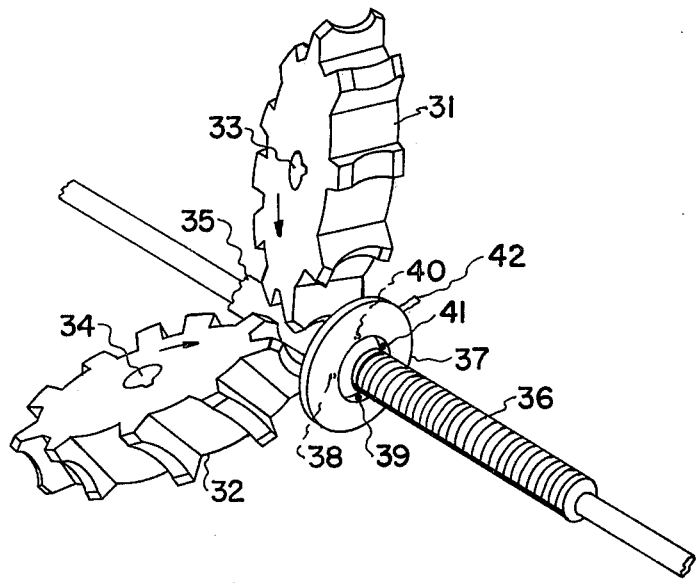
FIG. 3 is an isometric view showing an annular ring cut-off for severing shirred artificial sausage casing.

FIG. 3 is a view of a means for severing artificial sausage casings, suitably of a cellulosic or collagen material, immediately after it has been shirred. In referring to FIG. 3, shirring wheels 31 and 32 are supportably mounted on shafts 33 and 34 and disposed about a sausage casing 35 having a shirred portion 36. Actually, there are three shirring wheels in the arrangement; however, for convenience this does not show the third wheel. In severing the shirred portion 36 of the artificial sausage casings from the unshirred portion, the shirred portion 36 is pulled away from the shirring wheels 31 and 32 and the unshirred portion 35. An annular ring 37 is disposed about the artificial sausage casing immediately at the point where the shirred portion 36 ends. The annular ring 37 has four orifices, 38, 39, 40 and 41 each having a diameter of about 0.10 inches. Supply line 42 communicates with the annular ring 37 for supplying liquified $CO_2$ under pressure thereto. The $CO_2$ is emitted from the orifices 38, 39, 40 and 41 to define a spray pattern about the sausage casing. As the $CO_2$ is sprayed from these orifices (and evaporates to form $CO_2$ gas and particles of solid $CO_2$), the casing is cooled and the force (impingement) of the $CO_2$ gas and particles against the casing severs the shirred portion 36 from the unshirred sausage casing 35. A relatively smooth end is produced on compression of the shirred portion 36. The tab-like end normally encountered where the casing is severed with a knife or hot wire on this is not present.

Figure 4:
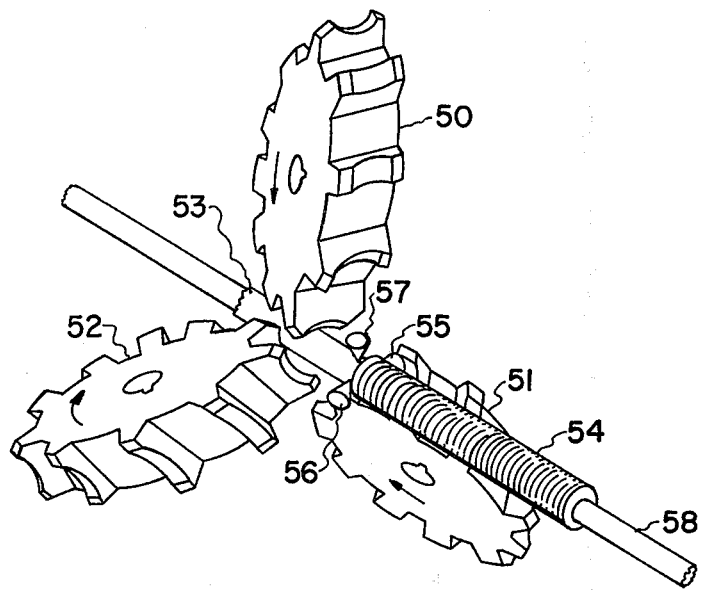
FIG. 4 is an isometric view of a cut-off mechanism using spray nozzles positioned at the shirring head.

In FIG. 4 a view of severing artificial sausage casings by means of spray nozzles is shown. Shirring wheels 50, 51, and 52 are disposed about a tubular casing of regenerated cellulose having a wall thickness of about 1.0 mil and a diameter of about 1.0 inches. The tubular casing 53 has a shirred portion 54. Spray nozzles 55, 56, and 57 are disposed equiangularly about the sausage casing 53 and equidistant, i.e., about 0.50 inches from the casing. The spray nozzles 55, 56, and 57 each have an annular orifice of about 0.20 inches in diameter. Mandrel 58 is disposed inside the bore of tubular casing 53. Mandrel 58 can be removed or left inside the casing during the severance of the casing.

The shirred portion of the casing is severed from the unshirred portion as follows. Liquified carbon dioxide stored at a pressure of about 325 psig and having a temperature of 0° F. is supplied to nozzles 55, 56 and 57 through supply lines not shown and is thereby directed against the end of the shirred portion 54 of the artificial sausage casing. The casing is severed by the substantially simultaneous cooling of the casing and impingement of the gas, the solid $CO_2$ particles, and ice crystals formed by the spraying of the gas through the nozzle. A spray period of 0.5 seconds generally is sufficient to sever the shirred portion of the casing from the non-shirred portion. A smooth end is provided on the shirred casing stick.

The views in FIGS. 3 and 4 are illustrative of those views taken of the severing mechanism positioned on conventional shirring machines adjacent to the shirring wheels. The severing apparatus can be adapted to any of the conventional shirring machines for severing the casing. It is particularly adapted to those shirring machines shown in U.S. Pat. Nos. 3,454,982; 3,454,981; 3,115,669; and 3,456,286. Such description of shirring machines is incorporated by reference.

What is claimed is:

1. A method for severing a flexible tubular film of polymeric material which comprises the steps of cooling the tubular film by impingement of a cold fluid at a predetermined locus continuously until the material becomes extremely brittle and said fluid flexes the tubular film to sever it.

2. The method of claim 1 wherein the method is for severing a tubular film and said cooling of said tubular film is accomplished by impinging a cold gas vaporized from a liquified gas against the surface of said tubular film.

3. The method of claim 2 wherein tubular film is a shirred artificial sausage casing and the spraying of said cold gas against the surface of the tubular film is performed in an atmosphere having a relative humidity of about 30% to 99% and having a temperature of from about 60° to 80° F.

4. The method of claim 3 wherein said shaped article is a tubular film having a wall thickness of from about 0.0005 to 0.010 inches.

5. The method of claim 4 wherein said liquified gas is liquid carbon dioxide.

6. The method of claim 5 wherein the cold $CO_2$ gas and solid particles from said carbon dioxide is sprayed for a period of from about 0.1 to 5 seconds against the tubular film.

7. The method of claim 2 in which said liquified gas is nitrogen.

* * * * *